(No Model.)

F. M. GROWNEY.
PNEUMATIC WHEEL TIRE.

No. 550,881. Patented Dec. 3, 1895.

WITNESSES:
Chas. Niola.
Geo. J. Hosler.

INVENTOR
F. M. Growney
BY
ATTORNEYS.

UNITED STATES PATENT OFFICE.

FRANK M. GROWNEY, OF NEW YORK, N. Y.

PNEUMATIC WHEEL-TIRE.

SPECIFICATION forming part of Letters Patent No. 550,881, dated December 3, 1895.

Application filed April 19, 1895. Serial No. 546,344. (No model.)

*To all whom it may concern:*

Be it known that I, FRANK M. GROWNEY, of New York city, in the county and State of New York, have invented a new and Improved Pneumatic Wheel-Tire, of which the following is a full, clear, and exact description.

The object of the invention is to provide a new and improved pneumatic wheel-tire for use on vehicles of all kinds and arranged in such a manner that the tire is not liable to be punctured or otherwise injured when passing over sharp obstructions in the road-bed.

The invention consists principally of a metallic tread secured to a tubular inflated rim and a band fastened to each side of the said rim and attached by a clamping-strip to the said tread.

The invention also consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1:
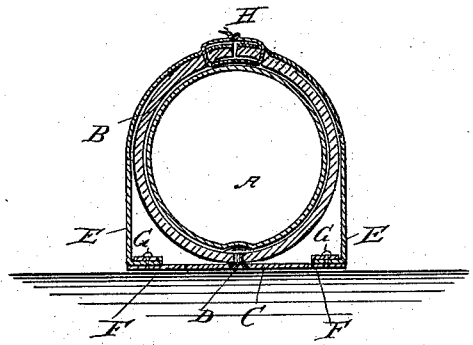
Figure 3:
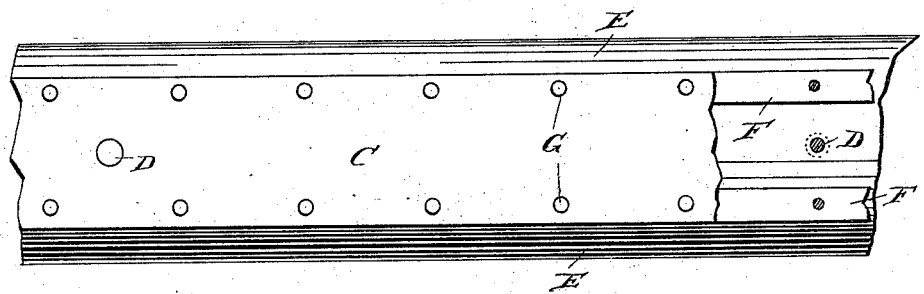
Figure 2:
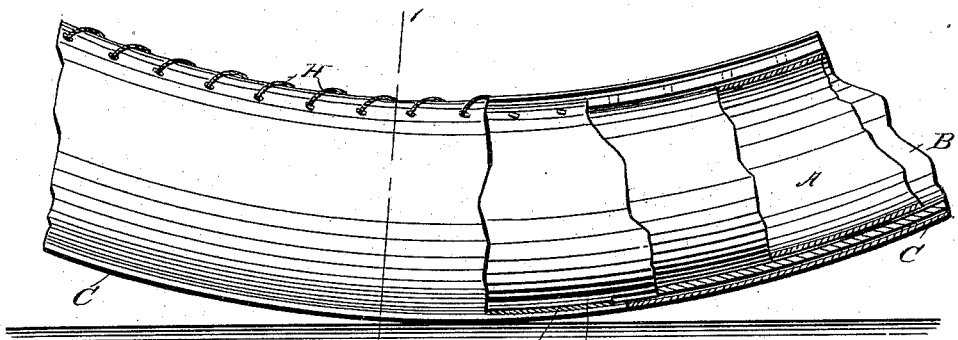

Figure 1 is a cross-section of the improvement on the line 1 1 of Fig. 2. Fig. 2 is a side elevation of the same with parts in section, and Fig. 3 is an inverted plan view of the same.

The improved wheel-tire is provided with an inner inflatable air-tube A, contained in the tubular inflatable rim B, secured in the usual manner at its inner face to the felly of the wheel of the vehicle on which the device is employed. A metallic tread C, made of a thin continuous strip, generally of mild steel, is attached to the outer part of the rim B by means of rivets D, placed at or near the middle of the said tread, as plainly indicated in Figs. 1 and 3. By this arrangement the tread C extends on opposite sides of the tubular rim B, and the outer ends of this tread are engaged by the sides of the bands E, extending over the sides of the rim B, as is plainly indicated in the drawings, the said sides of the bands being fastened in place on the tread by continuous metallic clamping-strips F, riveted or otherwise secured to the tread, as plainly shown at G in Figs. 1 and 3. The bands E are connected by the usual lacing H with the inner ends of the rim B, the said lacing being employed for attaching the inner ends of the said rim to each other, as is well known.

Now it will be seen that by the arrangement described the tread C is securely attached to the rim B, both at the outer and inner ends, so that the tread is securely held in place, and sharp obstructions in the road-bed cannot pass to the rim B without first puncturing either of the bands E. The rim is thus protected by the bands as well as by the continuous strip forming the tread, and as the latter only comes in contact with the road-bed the rim is not liable to be punctured by any sharp obstructions, such as nails and the like.

Having thus fully described my invention, I claim as new and desire to secure by Letters Patent—

The combination with a pneumatic tire circular in cross section of a flat metallic tread secured by fastening devices, intermediate of its edges to the pneumatic tire, thus providing a narrow contact between the tread and the extreme periphery of the tire so that the resilience or cushion action of the tire will not be impaired in any of its parts, and the flexible side bands extending from the edges of the tread to the inner side of the tire, the meeting edges of said side bands being detachably secured together, substantially as specified.

FRANK M. GROWNEY.

Witnesses:
  THEO. G. HOSTER,
  C. SEDGWICK.